United States Patent
West

(10) Patent No.: US 7,214,723 B2
(45) Date of Patent: May 8, 2007

(54) METHOD FOR THE DECONTAMINATION OF POLYETHYLENE TEREPHTHALATE

(75) Inventor: Simon Michael West, Williamston (AU)

(73) Assignee: Petrecycle Ltd., Melbourne, Victoria (AU)

( * ) Notice: Subject to any disclaimer, the term of this patent is extended or adjusted under 35 U.S.C. 154(b) by 236 days.

(21) Appl. No.: 10/788,622

(22) Filed: Feb. 27, 2004

(65) Prior Publication Data

US 2004/0242712 A1 Dec. 2, 2004

Related U.S. Application Data

(60) Provisional application No. 60/450,537, filed on Feb. 27, 2003.

(51) Int. Cl.
*C08J 11/04* (2006.01)
(52) U.S. Cl. ........................ 521/48.5; 521/48
(58) Field of Classification Search .............. 521/48, 521/48.5
See application file for complete search history.

(56) References Cited

U.S. PATENT DOCUMENTS

| | | | |
|---|---|---|---|
| 3,776,945 A | 12/1973 | Ligorati et al. | |
| 4,609,680 A | 9/1986 | Fujita et al. | |
| 5,298,530 A | 3/1994 | Gamble et al. | |
| 5,602,187 A | 2/1997 | West | |
| 6,580,005 B1 | 6/2003 | Yazaki et al. | |
| 2004/0182782 A1 | 9/2004 | Inada et al. | |

FOREIGN PATENT DOCUMENTS

| | | |
|---|---|---|
| DE | 10058773 | 8/2001 |
| EP | 0707563 | 2/1999 |
| GB | 2123403 | 2/1984 |
| WO | WO95/027753 | 10/1995 |
| WO | WO03/101929 | 12/2003 |

*Primary Examiner*—Edward J. Cain
(74) *Attorney, Agent, or Firm*—Reed Smith LLP

(57) ABSTRACT

A process for removing contaminants from PET components by mixing ethanediol with the PET feedstock at a temperature about the boiling point of ethanediol and for a time sufficient to convert the polyethylene terephthate components to polyethylene terephthate polymers which are soluble in the ethanediol and form bis(hydroxyethyl)terephthalate and produce a product mixture thereof containing insoluble materials. The soluble polyethylene terephthate polymers, bis(hydroxyethyl)terephthalate and ethanediol are recovered from the product mixture.

10 Claims, No Drawings

METHOD FOR THE DECONTAMINATION OF POLYETHYLENE TEREPHTHALATE

CROSS-REFERENCE TO RELATED APPLICATION

This application claims the benefit under 35 U.S.C. 119(e) of U.S. Provisional Application No. 60/450,537 filed Feb. 27, 2003.

FIELD OF THE INVENTION

The invention relates a method for the decontamination of polyethylene terephthalate ("PET").

BACKGROUND OF THE INVENTION

PET is a thermoplastic polyester that can be formed from 1,2-dihydroxyethane ("ethanediol") and terephthalic acid by direct esterification to form bis(hydroxy ethyl)terephthalate ester ("BHT") which is then polymerized by catalyzed ester exchange to useful polymers.

Traditionally, PET has been used extensively because it can be offered as an oriented film or fiber, has high tenacity, good electrical resistance and low moisture absorption together with a melting point of approximately 265° C. PET has been found to be particularly valuable for the manufacture of bottles for containing carbonated drinks where the bottle must have good tensile strength to resist explosion, and low mass for convenient transport and use. The extensive use of polyethylene terephthalate bottles has given rise to the need to recycle the PET bottles.

Methods for the removal of contaminants from PET are disclosed in U.S. Pat. No. 5,602,187, the contents of which are hereby incorporated by reference in their entirety. The methods disclosed in this patent all required a first pretreatment step to embrittle the PET components of the composition. Thereafter, the embrittled components are further treated so as to allow the contaminants to be removed. In particular, the PET was first embrittled in ethanediol then crushed and foreign plastics which remain uncrushed removed. The crushed crumb may be separated from paper fiber and glue by hindered settling.

This embrittlement step requires substantial time, manpower and expense to obtained the finished product.

The rise in the usage of PET bottles has caused a decrease in the usage of polyvinyl chloride (PVC) bottles as they are more expensive and are difficult to recycle. This development has markedly increased the PET content of the available recycled plastic bottle feedstock. Additionally, improvements in sorting technology now provides feedstock PET having lower contamination levels then the earlier feedstocks. Further, improvements in washing technology has resulted in reduction of potentially harmful contamination in such feedstocks.

As a result, a need exists for an improvement in the method for removal of contaminants from the PET feedstock to take advantage of the above noted advantages provided by these new technologies.

SUMMARY OF THE INVENTION

I have discovered a new process for removing contaminants from PET components which substantially reduces the costs, time and manpower requirements of the prior known processes. More particularly, I have found that one can do away with the step of embrittleling the PET components and proceed to direct conversion of these components to soluble materials and still obtain a removal of contaminants as good as that achieved with the embrittlement step. As a result, the embrittleing step which was heretofore thought necessary can thereby be avoided resulting in a substantial reduction in costs, equipment and time in converting the PET so that it can be recycled.

This is achieved by the inventive process which comprises: mixing ethanediol with the PET feedstock at a temperature about the boiling point of ethanediol and for a time period sufficient to convert the polyethylene terephthate components to polyethylene terephthate polymers which are soluble in the ethanediol and form bis(hydroxyethyl)terephtalate and produce a product mixture thereof with insoluble materials, and then recovering the soluble polyethylene terephthate polymers, bis(hydroxyethyl)terephthalate and ethanediol from the product mixture.

DETAILED DESCRIPTION OF THE INVENTION

Accordingly the invention provides a process for removing contaminants from PET components by depolymerising PET comprising the following steps:

a) transesterifying material containing PET by reacting with ethanediol, typically under pressure and with a mixture of PET oligomers having chain lengths of about 200 units and are in the form of solid flake at a temperature at or near the boiling point of ethanediol at the reactor pressure to convert the PET to oligomers having about 1 to 5 repeat units and a maximum mass fraction of about 3. Generally, the pressure of the reactor is in the range from about 0.8 to 5 bar absolute pressure.

b) Admixing a adsorbent with the product from the transesterification step capable of absorbing dyes and other contaminants in the mixture. Absorbents such as activated carbon and activated clay are preferred. The amount of absorbent may be varied depending on the level of contamination of the starting material. For example, for starting flake material that is relatively clear, on could use about 0.2% of active carbon and clay, respectively. However, this can be increased for flake the included high loads of PVC and amber PET. Typically, the adsorbent is mixed in and stirred for about 15 to 30 minutes;

c) a filtration aid is then admixed into the mixture of product and adsorbent and this mixture is subjected to pressure filtration. A clean decontaminated filtrate is obtained.

Previously decontamination of post consumer PET by a "tertiary" or chemical process required the removal of PVC to below 1% content, where hydrogen chloride generated by thermal decomposition of the PVC can be then be adsorbed onto active carbon and so limit the production of color by reactions of the hydrogen chloride.

The invention is illustrated by the following non-limiting example.

EXAMPLE 1

1500 lb of clean post consumer flake (that had been washed in hot water then passed through a float/sink tank to separate flotable labels and polyolefin caps etc.) was transferred to a jacketed stirred pressure reactor and 1000 lb of ethanediol added. The temperature was increased to 210° C. and the pressure allowed to Increase to 2 bar with reflux. After two hours the PET had reacted with the ethanediol to give a mainly dissolved mass of oligomers of PET. The temperature of the mass was cooled from about 210 to 170–180° C. by adding an additional 1000 lb of ethanediol, which also reduced the viscosity. 15 lb of activated carbon and 15 lb of activated clay were then added with continuing stirring.

At the same time, a pressure leaf filter (Amafilter 42V-160) was prepared by suspending 100b of coarse diatomite in 3000 lb of ethanediol at 180° C. and rapidly depositing a layer of compact diatomite on the filter leaves. The ethanediol was removed by introducing hot nitrogen gas under pressure to dry the filter cake. 15 lb of fine diatomite was then added to the reactor and the contents passed through the filter to separate the adsorbents with the colors, glue and undissolved pigments and foreign plastics such as, PVC and polyolefins, that were not transesterified. The filtrate recovered was free of particulate.

Since modifications to the steps described are various and obvious to those skilled in this art it is to be understood that this invention is not limited to the particular embodiments described.

I claim:

1. A process for removing contaminants from PET without the formation of embrittled PET during the process consisting essentially of:
    (a) mixing ethanediol with unembrittled PET which contains contaminants at a temperature about the boiling point of ethanediol for a time sufficient to convert the polyethylene terephthalate components to polyethylene terephthalate polymers which are soluble in the ethanediol and form bis (hydroxyethyl) terephthalate and produce a product mixture thereof with insoluble material;
    (b) recovering the soluble polyethylene terephthalate polymers and bis (hydroxyethyl) terephthalate and ethanediol from the mixture.

2. The process of claim 1 wherein the soluble polyethylene terephthate polymers and ethanediol are recovered from the product mixture by filtration.

3. The process of claim 2 wherein the filtration is high pressure filtration.

4. The process of claim 2 wherein a material selected from the group consisting of activated carbons and mixtures of activated carbons and activated clays is added to the product mixture prior to filtration.

5. The process of claim 1 wherein the PET is in the form of oligomers having chain lengths of about 200 repeat units.

6. The process of claim 5 wherein the PET is converted to oligomers having about 1 to 5 repeat units.

7. A process for treating a composition without the formation of embrittled PET during the process consisting essentially of unembrittled contaminated polyethylene terephthalate components to remove the contaminants therefrom comprising:
    (a) reacting the unembrittled polyethylene terephthalate components with ethanediol at a temperature at or about the boiling point of ethanediol for a period of time sufficient to transesterify the polyethylene terephthalate components and form a solution containing products selected from the group consisting of soluble polyethylene terephthalate polymers, bis(hydroxy ethyl) terephthalate ester and mixtures thereof;
    (b) recovering the products from the solution; and
    (c) treating the recovered product at a pressure and temperature and for a period of time sufficient to hydrolyze the recovered products and produce an ethanediol solution and crystals of terephthalic acid.

8. The process of claim 7 wherein the products are recovered from the solution by filtration.

9. The process of claim 8 wherein a material selected from the group consisting of activated carbon and mixtures of activated carbon and activated clay is added to the product mixture prior to filtration.

10. The process of claim 7 wherein the products are recovered by density separation.

* * * * *